United States Patent
Wang et al.

(10) Patent No.: US 12,200,104 B2
(45) Date of Patent: Jan. 14, 2025

(54) METHOD AND APPARATUS FOR NEURAL NETWORK MODEL ENCRYPTION AND DECRYPTION

(71) Applicant: HON HAI PRECISION INDUSTRY CO., LTD., New Taipei (TW)

(72) Inventors: Wei-Chun Wang, New Taipei (TW); Jung-Hao Yang, New Taipei (TW); Chih-Te Lu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 457 days.

(21) Appl. No.: 17/684,542

(22) Filed: Mar. 2, 2022

(65) Prior Publication Data
US 2022/0286272 A1   Sep. 8, 2022

(30) Foreign Application Priority Data
Mar. 2, 2021   (CN) .......................... 202110231557.6

(51) Int. Cl.
*H04L 9/06* (2006.01)
*G06F 21/60* (2013.01)
*G06N 3/10* (2006.01)

(52) U.S. Cl.
CPC .......... *H04L 9/0625* (2013.01); *G06F 21/602* (2013.01); *G06N 3/10* (2013.01); *H04L 9/0631* (2013.01); *H04L 9/0643* (2013.01)

(58) Field of Classification Search
CPC ... H04L 9/0625; H04L 9/0631; H04L 9/0643; G06F 21/602; G06N 3/10
USPC ........................................................... 380/29
See application file for complete search history.

(56) References Cited

U.S. PATENT DOCUMENTS

| | | | | |
|---|---|---|---|---|
| 9,652,770 | B1* | 5/2017 | Kurani | G06Q 20/385 |
| 10,956,584 | B1* | 3/2021 | Heaton | G06F 9/3802 |
| 11,886,554 | B1* | 1/2024 | Zhang | G06F 21/57 |
| 2020/0401674 | A1* | 12/2020 | Morrow | H04L 9/3247 |
| 2021/0211291 | A1* | 7/2021 | Jindal | H04L 9/3231 |
| 2022/0147801 | A1* | 5/2022 | Davidi | G06N 3/10 |
| 2022/0245447 | A1* | 8/2022 | Liu | G06N 3/08 |

FOREIGN PATENT DOCUMENTS

CN   109040091 A   12/2018

* cited by examiner

*Primary Examiner* — Dereena T Cattungal
(74) *Attorney, Agent, or Firm* — ScienBiziP, P.C.

(57) ABSTRACT

A method for neural network model encryption and decryption includes a first apparatus stores a neural network model and obtains hardware configuration information of the first apparatus, and obtains an encryption key accordingly; encrypts the neural network model by a predetermined encryption algorithm; a second apparatus obtains the encrypted neural network model from the first apparatus, transmits a decryption request to the first apparatus, obtains the hardware configuration information from the first apparatus, obtains a decryption key based on the hardware configuration information; and decrypts the encrypted neural network model by a predetermined decryption algorithm.

20 Claims, 4 Drawing Sheets

S101 — Obtaining hardware configuration information of the first apparatus applying the neural network model, and obtaining an encryption key based on the hardware configuration information S102 — Encrypting the neural network model by a predetermined encryption algorithm.

METHOD AND APPARATUS FOR NEURAL NETWORK MODEL ENCRYPTION AND DECRYPTION

CROSS-REFERENCE TO RELATED APPLICATIONS

This application claims priority to China Patent Application No. 202110231557.6 filed on Mar. 2, 2021, the contents of which are incorporated by reference herein.

FIELD

The subject matter herein generally relates to data security, and particularly to a method and an apparatus for neural network model encryption and decryption.

BACKGROUND

Once the file of a model has been saved, encryption using a fixed password is normally used, decryption is the reverse process using the same password. However, encryption by such means is simple, a network structure and a weighting of the model may be easily revealed, which may allow the model to be easily copied and spread. Models saved by the above described method need better protection.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
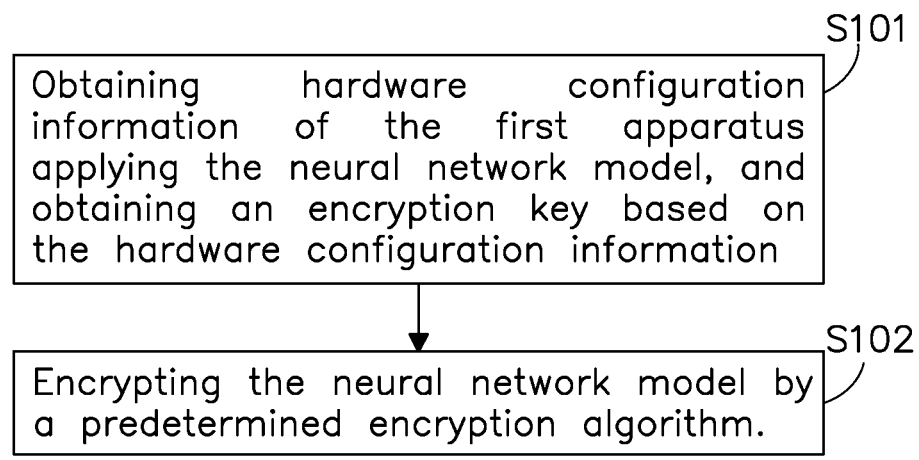
FIG. 1 is a flowchart of at least one embodiment of a method for neural network model encryption.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; in detail, it indicates open-ended inclusion or membership in a so-described combination, group, series, and the like.

The method for neural network model encryption and decryption may be applied in a computing apparatus. The apparatus may preset or store instructions and automatically compute data and/or process information, including hardwares such as a central processing unit (CPU), a microprocessor, a digital signal processor (DSP), a graphics processor, an application specific integrated circuit (ASIC), a field-programmable gate array (FPGA), a data processor chip, a programable logic device (PLD), a discrete gate/transistor logic device, or a discrete hardware component. The apparatus may further include network equipment and/or user equipment. The network equipment may include, but is not limited to, single network equipment, servers formed by several network equipment, or clouds formed by a plurality of hosts and network equipment based on cloud computing. The cloud computing may be one of distributed computing and a super virtual computer formed by a group of coupled computers. The user equipment may include any type of electronic product that can provide man-machine interaction through a keyboard, a mouse, a remote control, a touchpad, or a voice control device. The apparatus may be a personal computer, a tablet computer, a laptop computer, a smart phone, a personal digital assistant (PDA), etc.

FIG. 1 illustrates a method for neural network model encryption applied in an apparatus. The functions may be integrated in the apparatus for the method for neural network model encryption. In another embodiment, the method for neural network model encryption can be run in a form of software development kit in the apparatus.

In at least one embodiment, an apparatus storing a neural network model may be a first apparatus, the method for neural network model encryption may be applied in the first apparatus, and a method for neural network model decryption hereafter may also be applied in the first apparatus, or other apparatus (such as a second apparatus described hereafter).

The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S101.

At block S101, obtaining hardware configuration information of the first apparatus applying the neural network model, and obtaining an encryption key based on the hardware configuration information.

A neural network model may be copied to other apparatus which is unauthorized but in at least one embodiment, obtaining the hardware configuration information of the first apparatus applying the neural network model and converting the hardware configuration information into a key, thus to effectively limit the use of the neural network model by the hardware configuration information of the first apparatus.

In at least one embodiment, the neural network model may be a trained neural network model.

In at least one embodiment, the hardware configuration information may include graphic processing unit (GPU) configuration information, central process unit (CPU) configuration information, and hard disk configuration information. The hardware configuration information may be selected by user, such as a universally unique identifier (UUID) of the GPU as the hardware configuration information. The UUID comprises numbers generated in an apparatus which uniquely identify the apparatus.

In at least one embodiment, the obtaining an encryption key based on the hardware configuration information further includes:

Calculating the hardware configuration information through a secure hash algorithm (SHA) to obtain the encryption key. SHA may be a cipher hash function family, which may be selected by user, such as SHA-256.

At block S102, encrypting the neural network model by a predetermined encryption algorithm.

To prevent the neural network model from being copied and used, encrypting a content of a structural definition file of the neural network model by the predetermined encryption algorithm.

In at least one embodiment, the encrypting the neural network model by a predetermined encryption algorithm further includes:

Reading a first structural definition file of the neural network model. In detail, based on structural information of the neural network model, extracting a first structural definition file Model.pb of the neural network model from a file system;

Encrypting the first structural definition file by the predetermined encryption algorithm, to obtain an encrypted neural network model. The predetermined encryption algorithm may include a data encryption standard (DES) algorithm and an advanced encryption standard (AES) algorithm, which may be selected by user, thus the AES algorithm may be selected as the predetermined encryption algorithm.

Selectively, after block S102, the method further includes:

Storing the encrypted neural network model to a database, such as a local database established in a memory of the first apparatus, or a database established in a storage device communicating with the first apparatus.

The method described above and shown in FIG. 1 improves a safety for the neural network model, and prevents the neural network model from being copied and used illegally, meanwhile simplifying an encryption process and providing convenience for later use.

Figure 2:
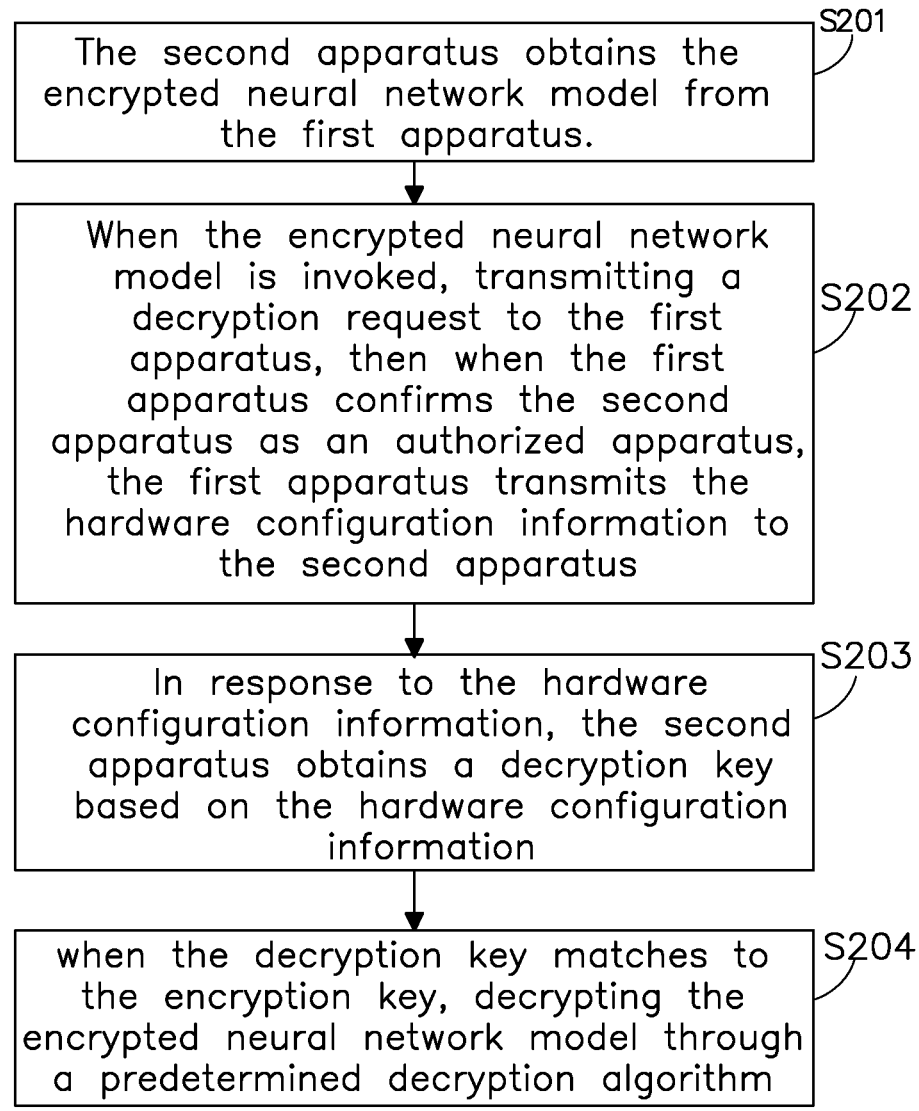
FIG. 2 is a flowchart of at least one embodiment of a method for neural network model decryption.

FIG. 2 illustrates a flowchart of at least one embodiment of a method for neural network model decryption. The functions may be integrated in the apparatus for the method for neural network model decryption. In another embodiment, the method for neural network model decryption can be run in a form of software development kit in the apparatus.

The encrypted neural network model is stored in the first apparatus, when the second apparatus obtains the encrypted neural network model, decrypting the encrypted neural network model is needed for further using the neural network model, detail description is provided below.

The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S201.

At block S201, the second apparatus obtains the encrypted neural network model from the first apparatus.

In at least one embodiment, the second apparatus may be an authorized apparatus or an unauthorized apparatus. Only the authorized apparatus will be allowed to use the neural network model, the unauthorized apparatus will not be allowed to use the neural network model.

At block S202, when the encrypted neural network model is invoked, transmitting a decryption request to the first apparatus. When the first apparatus confirms the second apparatus as an authorized apparatus, the first apparatus can transmit the hardware configuration information to the second apparatus.

Limiting the apparatus that are able to use the neural network model prevents the neural network model from being used illegally.

In at least one embodiment, the second apparatus invokes the encrypted neural network model and triggers a decryption request, and further transmits the decryption request to the first apparatus. The decryption request includes an unique identifier of the second apparatus and an indication of decrypting the neural network model. The unique identifier of the second apparatus may be set according to user, such as, an ID number of the apparatus.

In at least one embodiment, the first apparatus may establish an authorized apparatus database for storing the unique identifiers of the authorized apparatus, such as ID numbers.

The first apparatus receives the decryption request and traverses the authorized apparatus database according to the unique identifier of the second apparatus. When a same unique identifier is found in the authorized apparatus database, the first apparatus determines that the second apparatus is an authorized apparatus and then transmits the hardware configuration information to the second apparatus.

When no matching unique identifier is found in the authorized apparatus database, the first apparatus refuses the decryption request.

Additionally, when the first apparatus determines the second apparatus to be an unauthorized apparatus, the first apparatus may respond to the decryption request by transmitting response to prompt the second apparatus to provide user information. When the first apparatus determines the user according to the user information, the first apparatus may authorize the second apparatus, which includes: adding the ID number of the second apparatus to the authorized apparatus database, and transmitting the hardware configuration information to the second apparatus.

At block S203, in response to the hardware configuration information, the second apparatus obtains a decryption key based on the hardware configuration information.

For a further use of the neural network model, decrypting the encrypted neural network model is needed. The hardware configuration information is set as encryption key in block S101, and a decryption key is obtained to decrypt the encrypted neural network model.

In at least one embodiment, the second apparatus obtains a decryption key based on the hardware configuration information further includes:

Obtaining the decryption key by calculating the hardware configuration information through the SHA-256.

At block S204, when the decryption key matches the encryption key, decrypting the encrypted neural network model through a predetermined decryption algorithm.

To decrypt the encrypted neural network model through the predetermined decryption algorithm, the decryption key is compared with the encryption key.

In at least one embodiment, the decrypting the encrypted neural network model through a predetermined decryption algorithm further includes:

Reading a second structural definition file of the encrypted neural network model;

Decrypting the second structural definition file by the predetermined decryption algorithm, to obtaining a decrypted neural network model. The predetermined decryption algorithm may include a data encryption standard (DES) algorithm and an advanced encryption standard (AES) algorithm, which may be selected by user, such as the AES algorithm being selected as the predetermined decryption algorithm.

In other embodiments, if the method for neural network model decryption is applied in the first apparatus, the method further includes:

When the first apparatus invokes the encrypted neural network model, obtaining the decryption key based on the hardware configuration information;

When the decryption key matches the encryption key, decrypting the encrypted neural network model by the predetermined decryption algorithm.

The method for neural network model decryption further includes:

When the decryption key does not match the encryption key, outputting indication of decryption failure.

By requiring a matching of the decryption key to the encryption key for decryption, reliability and safety of the neural network model in the apparatus is improved.

The method for neural network model decryption shown in FIG. 2 improves a safety for the neural network model and prevent the neural network model from being copied and used illegally, meanwhile simplifying an decryption process and providing convenience for later use.

Figure 3:
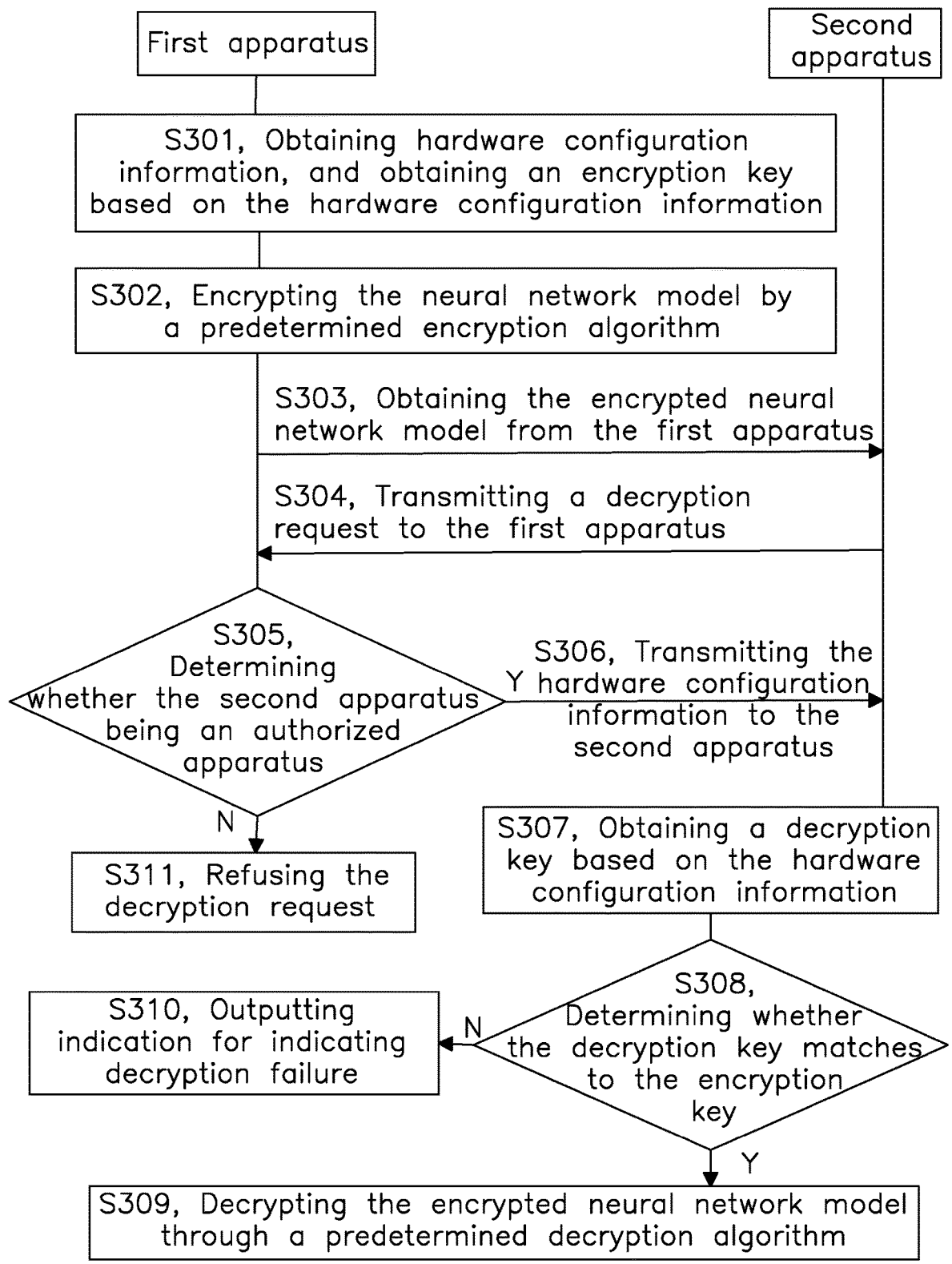
FIG. 3 is an interaction flowchart of at least one embodiment of a method for neural network model encryption and decryption.

FIG. 3 illustrates an interaction flowchart of at least one embodiment of a method for neural network model encryption and decryption. The functions may be integrated in the first apparatus and the second apparatus for the method for neural network model encryption and decryption. In another embodiment, the method for neural network model encryption and decryption can be run in a form of software development kit in the first apparatus and the second apparatus.

The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S301.

At block S301, the first apparatus stores a neural network model and obtains hardware configuration information needed when the neural network model in use, and obtains an encryption key based on the hardware configuration information.

At block S302, the first apparatus encrypts the neural network model by a predetermined encryption algorithm.

At block S303, the second apparatus obtains the encrypted neural network model from the first apparatus.

At block S304, the second apparatus transmits a decryption request to the first apparatus.

At block S305, the first apparatus receives the decryption request and determines whether the second apparatus being an authorized apparatus.

At block S306, if the second apparatus is an authorized apparatus, the first apparatus transmits the hardware configuration information to the second apparatus.

At block S307, the second apparatus obtains a decryption key based on the hardware configuration information.

At block S308, the second apparatus determines whether the decryption key matches to the encryption key.

At block S309, if the decryption key matches to the encryption key, the second apparatus decrypts the encrypted neural network model through a predetermined decryption algorithm.

At block S310, if the decryption key does not match to the encryption key, the second apparatus outputs indication for indicating decryption failure.

At block S311, if the second apparatus is an unauthorized apparatus, the first apparatus refuses the decryption request.

The method for neural network model encryption and decryption shown in FIG. 3 may improve a safety for the neural network model and prevent the neural network model from being copied and used, meanwhile simplifying an decryption process and providing convenient for later use.

Figure 4:
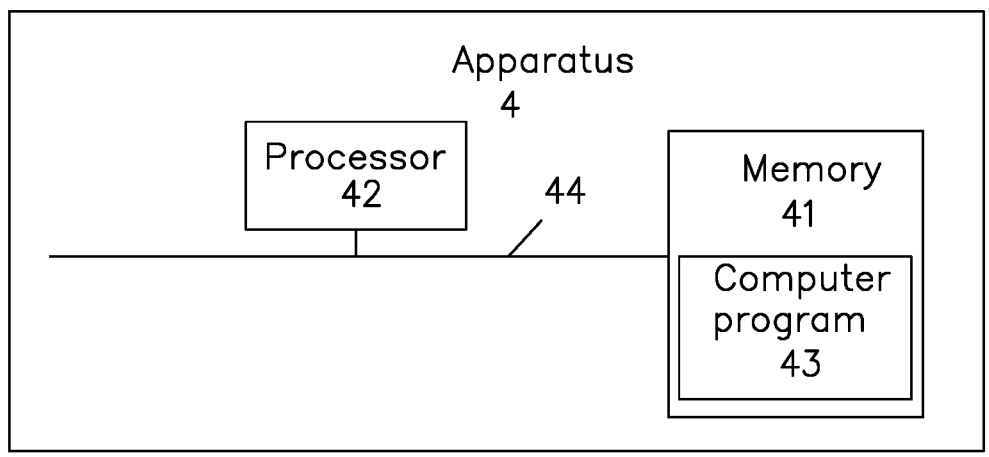
FIG. 4 illustrates a schematic view of at least one embodiment of an apparatus for neural network model encryption and decryption.

FIG. 4 illustrates a schematic view of at least one embodiment of an apparatus for neural network model encryption and decryption. The apparatus 4 includes a memory 41, at least one processor 42, a computer program 43, and at least one communication bus 44. The computer program 43 can be stored in the memory 41 and processed by the at least one processor 42.

The apparatus 4 may be a smart phone, a personal digital assistant (PDA), a wearable electronic device, a tablet computer, a laptop computer, an embedded computer, a personal computer, or a server. In at least one embodiment, the apparatus 4 may include more or less components, modules, circuits, elements, or assemblies other than the modules shown in the figures. The apparatus 4 may be in a network, such as internet, wide area network (WAN), metropolitan area network (MAN), local area network (LAN), virtual private network (VPN), etc.

In at least one embodiment, the memory 41 can include various types of non-transitory computer-readable storage mediums. For example, the memory 41 can be an internal storage system, such as a flash memory, a random access memory (RAM) for the temporary storage of information, and/or a read-only memory (ROM) for permanent storage of information. The memory 41 can also be an external storage system, such as a hard disk, a storage card, or a data storage medium.

In at least one embodiment, the processor 42 can be a central processing unit (CPU), a microprocessor, a digital signal processor (DSP), an application specific integrated circuit (ASIC), a field-programmable gate array (FPGA), a data processor chip, a programable logic device (PLD), a discrete gate/transistor logic device, or a discrete hardware component. The processor 42 may be electrically connected to other elements of the apparatus 4 through interfaces or a bus, such as the at least one communication bus 44. In at least one embodiment, the apparatus 4 includes a plurality of interfaces configured to communicate with other devices or apparatus.

In at least one embodiment, the computer program 43 is configured to be processed by the processor 42 to perform the method for neural network model encryption and decryption, such as the method for neural network model encryption shown in FIG. 1, the method for neural network model decryption shown in FIG. 2, and the method for neural network model encryption and decryption shown in FIG. 3.

In at least one embodiment, the computer program 43 can be divided into one or more elements/modules, the one or more elements/modules are stored in the memory 41 and can be run by the at least one processor 42 to perform the method for neural network model encryption and decryption. The one or more elements/modules can be computer program instructions describing process of the apparatus 4 for neural network model encryption and decryption.

In at least one embodiment, the computer program 43 can be non-transitory computer program medium integrated in the processor 42 and processed by the least one processor 42 to perform the method for neural network model encryption and decryption shown in FIGS. 1-3.

In at least one embodiment, the apparatus 4 may be the first apparatus and/or the second apparatus.

A non-transitory computer-readable storage medium including program instructions for causing the apparatus to perform the method for neural network model encryption and decryption is also disclosed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method of neural network model encryption applied in a first apparatus storing a neural network model, the method comprising:

obtaining hardware configuration information of the first apparatus applying the neural network model, and obtaining an encryption key based on the hardware configuration information, wherein the neural network model is a trained neural network model; encrypting the neural network model by a predetermined encryption algorithm; copying the encrypted neural network model to a second apparatus; and receiving a decryption request from the second apparatus, determining whether the second apparatus is an authorized apparatus; if the second apparatus is an authorized apparatus, transmitting the hardware configuration information to the second apparatus, wherein the hardware configuration information is configured to obtain a decryption key for decrypting the encrypted neural network model, and the decrypted neural network model is invokable by the second apparatus.

2. The method according to claim 1, further comprising: the first apparatus invoking the encrypted neural network model, obtaining the decryption key based on the hardware configuration information; and if the decryption key matches to the encryption key, decrypting the encrypted neural network model by a predetermined decryption algorithm.

3. The method according to claim 2, further comprising: the first apparatus receiving the decryption request from the second apparatus, determining whether the second apparatus is an authorized apparatus; if the second apparatus is not an authorized apparatus, refusing the decryption request.

4. The method according to claim 1, wherein the encrypting the neural network model by a predetermined encryption algorithm comprises:

reading a first structural definition file of the neural network model; and encrypting the first structural definition file by the predetermined encryption algorithm, to obtain the encrypted neural network model.

5. The method according to claim 1, wherein the obtaining the encryption key based on the hardware configuration information further comprises:

calculating the hardware configuration information through a secure hash algorithm (SHA) to obtain the encryption key.

6. The method according to claim 1, further comprising: storing the encrypted neural network model to a database of the first apparatus.

7. The method according to claim 1, wherein the predetermined encryption algorithm comprises a data encryption standard (DES) algorithm and an advanced encryption standard (AES) algorithm.

8. A method for neural network model decryption applied in a second apparatus, wherein the neural network model is a trained neural network model stored in a first apparatus, an encryption key is obtained based on a hardware configuration information of the first apparatus applying the neural network model, the method comprises:

the second apparatus obtaining an encrypted neural network model encrypted by the first apparatus copied from the first apparatus;

after the encrypted neural network model is invoked, the second apparatus transmits a decryption request to the first apparatus, if the second apparatus is determined to be an authorized apparatus by the first apparatus, obtaining the hardware configuration information from the first apparatus;

in response to the hardware configuration information, the second apparatus obtains a decryption key based on the hardware configuration information; and if the decryption key matches the encryption key, decrypting the encrypted neural network model by a predetermined decryption algorithm, wherein the decrypted neural network model is invokable by the second apparatus.

9. The method according to claim 8, wherein the decrypting the encrypted neural network model by the predetermined decryption algorithm comprises:
reading a second structural definition file of the encrypted neural network model; and
decrypting the second structural definition file by the predetermined decryption algorithm, to obtaining a decrypted neural network model.

10. The method according to claim 8, wherein the second apparatus obtains the decryption key based on the hardware configuration information further comprises:
calculating the hardware configuration information through a secure hash algorithm (SHA) to obtain the decryption key.

11. The method according to claim 8, wherein the decryption request comprises a unique identifier of the second apparatus and an indication of decrypting the neural network model.

12. The method according to claim 8, wherein the predetermined decryption algorithm comprises a data encryption standard (DES) algorithm and an advanced encryption standard (AES) algorithm.

13. The method according to claim 8, further comprising:
if the decryption key does not match the encryption key, outputting indication for indicating decryption failure.

14. A method for neural network model encryption and decryption comprises:
a first apparatus storing a neural network model and obtaining hardware configuration information of the first apparatus applying the neural network model, and obtaining an encryption key based on the hardware configuration information, wherein the neural network model is a trained neural network model;
the first apparatus encrypting the neural network model by a predetermined encryption algorithm;
a second apparatus obtaining the encrypted neural network model copied from the first apparatus;
after the encrypted neural network model being invoked, the second apparatus transmitting a decryption request to the first apparatus, if the second apparatus being determined to be an authorized apparatus by the first apparatus, obtaining the hardware configuration information from the first apparatus;
in response to the hardware configuration information, the second apparatus obtaining a decryption key based on the hardware configuration information; and
if the decryption key matches the encryption key, decrypting the encrypted neural network model by a predetermined decryption algorithm, wherein the decrypted neural network model is invokable by the second apparatus.

15. The method according to claim 14, further comprises:
if the decryption key does not match the encryption key, the second apparatus outputting indication for indicating decryption failure.

16. The method according to claim 14, wherein the comprises:
if the second apparatus being determined to be an unauthorized apparatus by the first apparatus, the first apparatus refusing the decryption request.

17. The method according to claim 14, wherein the first apparatus encrypting the neural network model by the predetermined encryption algorithm further comprises:
reading a first structural definition file of the neural network model; and
encrypting the first structural definition file by the predetermined encryption algorithm, to obtain the encrypted neural network model.

18. The method according to claim 14, wherein the obtaining the encryption key based on the hardware configuration information comprises:
calculating the hardware configuration information through a secure hash algorithm (SHA) to obtain the encryption key;
wherein the second apparatus obtains the decryption key based on the hardware configuration information comprises:
calculating the hardware configuration information through the secure hash algorithm to obtain the decryption key.

19. The method according to claim 14, wherein the decrypting the encrypted neural network model by the predetermined decryption algorithm comprises:
reading a second structural definition file of the encrypted neural network model; and
decrypting the second structural definition file by the predetermined decryption algorithm, to obtaining the decrypted neural network model.

20. The method according to claim 14, wherein the predetermined encryption algorithm and the predetermined decryption algorithm comprises a data encryption standard (DES) algorithm and an advanced encryption standard (AES) algorithm.

* * * * *